United States Patent [19]
Sato

[11] Patent Number: 4,782,399
[45] Date of Patent: Nov. 1, 1988

[54] IMAGE PROCESSING APPARATUS WITH HIGH- AND LOW-RESOLUTION IMAGE SENSORS AND AN EDGE DETECTOR

[75] Inventor: Hiroaki Sato, Tokyo, Japan

[73] Assignee: Canon Kabushiki Kaisha, Tokyo, Japan

[21] Appl. No.: 746,103

[22] Filed: Jun. 18, 1985

[30] Foreign Application Priority Data
Jun. 26, 1984 [JP] Japan ................... 59-130182

[51] Int. Cl.$^4$ ............................. H04N 1/40
[52] U.S. Cl. ..................... 358/280; 358/283; 358/284
[58] Field of Search ............ 358/280, 282, 283, 284

[56] References Cited

U.S. PATENT DOCUMENTS

| | | | |
|---|---|---|---|
| 4,004,079 | 1/1977 | Boston | 358/283 |
| 4,194,221 | 3/1980 | Stoffel | 358/280 |
| 4,288,821 | 9/1981 | Lavallee et al. | 358/280 |
| 4,403,257 | 9/1983 | Hsieh | 358/280 |
| 4,554,593 | 11/1985 | Fox et al. | 358/284 |
| 4,577,235 | 3/1986 | Kannapell et al. | 358/282 |

FOREIGN PATENT DOCUMENTS 58-191571 11/1983 Japan ................... 358/283

OTHER PUBLICATIONS

H. R. Schindler et al., "Optical Scanning of Continuous-Tone and Line Documents With Spatial Frequency Separation for Improved Data Handling and Compaction", *IBM Technical Disclosure Bulletin*, vol. 20, No. 12, May 1978, pp. 5416-5421.

Tomory, Ronald S., "Halftone Detection Using Transition Counter", Xerox Disclosure Journal, vol. 5, No. 6, Nov./Dec. 1980, p. 643.

*Primary Examiner*—James J. Groody
*Assistant Examiner*—Randall S. Svihla
*Attorney, Agent, or Firm*—Fitzpatrick, Cella, Harper & Scinto

[57] ABSTRACT

An image processing apparatus has image input systems for inputting image data at high and low resolutions, a high pass filter for filtering the low-resolution image data, an image property discrimination processor for discriminating an edge in the high-pass filtered low-resolution image data, and a signal selection circuit for selecting the image of high or low resolution in accordance with the discrimination result of the discrimination processor. The apparatus processes image signals so as to reproduce optimum quality images for all types of original images including character and halftone images.

13 Claims, 7 Drawing Sheets ns and an Edge Detector

IMAGE PROCESSING APPARATUS WITH HIGH- AND LOW-RESOLUTION IMAGE SENSORS AND AN EDGE DETECTOR

BACKGROUND OF THE INVENTION

1. Field of the Invention

The present invention relates to an image processing apparatus for converting by the dither method or the like a monochromatic or color input image signal into an output signal suitable for digital printing and, more particularly, to an image processing apparatus for dividing an input image signal into blocks by a specific image processing method and for performing different processing for each block.

2. Description of the Prior Art

A digital copying machine is known which photoelectrically reads an original image with a line sensor such as a CCD and records an image on recording paper based on the read image signal.

In such a copying machine, in order to allow reproduction of a high-quality image, a high-resolution image reading method is adopted.

When an image is read with a high resolution, line images such as characters can be reproduced clearly. However, when a dot image or stripe image such as a halftone image (e.g., a printed photograph) is read with a high resolution and when a read output is dither-processed for pseudo-halftone reproduction, the reproduced image is subject to image degradation such as occurrence of moiré.

If an image is read at a low resolution in order to prevent moire, the edges of the reproduced image are disturbed.

SUMMARY OF THE INVENTION

The present invention has been made in consideration of this and has as its object to provide an image processing apparatus which can output a high-quality image signal.

It is another object of the present invention to provide an image processing apparatus which can automatically obtain a high-quality output image for every type of image, such as halftone images, characters, or photographs.

It is still another object of the present invention to provide an image processing apparatus which can appropriately discriminate image contents and can process image data in accordance with the discrimination result.

It is still another object of the present invention to provide an image processing apparatus suitably adapted for processing image signals obtained by photoelectrically reading an original image.

The above and other objects, features and advantages of the present invention will become apparent from the following description when taken in conjunction with the accompanying drawings.

DETAILED DESCRIPTION OF THE PREFERRED EMBODIMENTS

The present invention will be described in detail with reference to its preferred embodiments.

Figure 1:
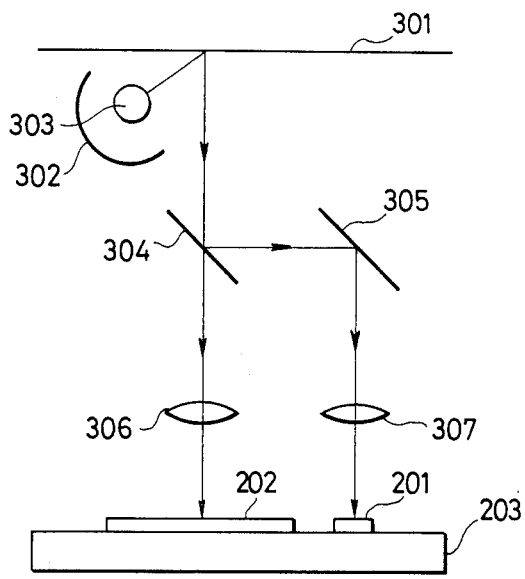
FIG. 1 is a view showing the arrangement of an original reader.

FIG. 1 shows an arrangement of an original reader for reading an original image using a photosensor element. A light source 303 for illuminating an original 301 has a reflector 302 for reflecting light therefrom. A half mirror 304 is arranged in the light path of light reflected from the original 301. A reflecting mirror 305 changes the light path of the light reflected by the half mirror 304. Imaging optical systems 306 and 307 include imaging lenses. The original 301 is moved from the right to the left in FIG. 1 by a moving mechanism (not shown).

Of the light reflected by the original 301, the light component transmitted through the half mirror 304 is focused by one imaging lens 306 and is received by a low-resolution line sensor 202 for reading at a low resolution.

However, the light component reflected by the half mirror 304 is changed in its light path by the reflecting mirror 305 and is focused by the other imaging lens 307. This light component is received by a high-resolution line sensor 201. With the reader of the above arrangement, an image of the same line is simultaneously read by the two line sensors 201 and 202 on a single board 203.

Figure 2:
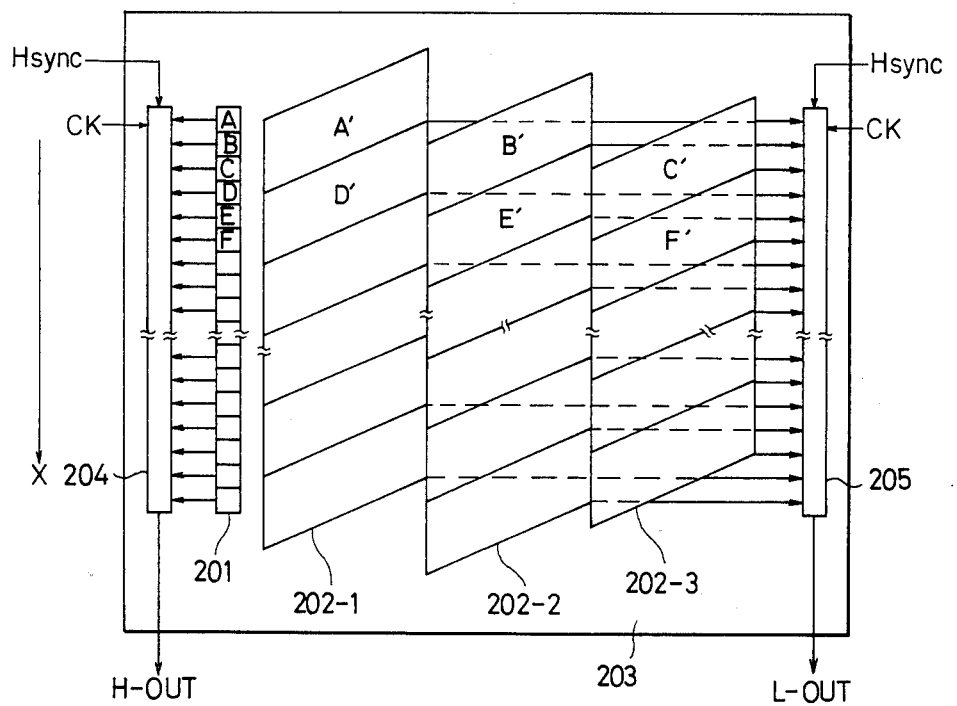
FIG. 2 is a top view of a line sensor used in the reader shown in FIG. 1.

FIG. 2 is a top view of the board 203 shown in FIG. 1. The high-resolution line sensor 201 shown in FIG. 1 comprises a row of several thousands of photosensor elements aligned in the X direction (corresponding to the vertical direction in FIG. 2). The low-resolution line sensor 202 shown in FIG. 1 comprises three rows 202-1, 202-2 and 202-3 of photosensor elements, in each of which a plurality of elements are aligned along the X direction. The sensor elements of the sensor 202 have larger areas than those of the elements of the sensor 201. The elements of the respective rows 202-1, 202-2, and 202-3 of the low-resolution line sensor 202 corresponds to the elements of the high-resolution line sensor 201. More specifically, a photosensor element A of the high-resolution line sensor 201 corresponds to a photosensor element A' of the row 202-1, a photosensor element B of the line sensor 201 corresponds to a photosensor element B' of the row 202-2, a photosensor element C of the line sensor 201 corresponds to a photosensor element C' of the row 202-3, and so on.

With the reader of the above arrangement, a low-resolution read signal can be obtained by the elements of the low-resolution line sensor 202 in correspondence with a high-resolution read signal from the elements of the high-resolution line sensor 201.

Parallel-in-serial-out registers 204 and 250 temporarily store the outputs from the line sensors 201 and 202, respectively, in response to a horizontal sync signal Hsync, and serially shift these signals in accordance with shift clocks CK.

The registers 204 and 205 respectively produce a high-resolution image signal H-OUT and a low-resolution image signal L-OUT.

The serial analog image signal output in this manner is amplified by an amplifier (not shown), converted into a digital image signal of a predetermined number of bits, and processed by a processing circuit to be described later.

In the arrangement shown in FIG. 1, the light path is divided by the half mirror and each single line is simultaneously read by two line sensors. However, the present invention is not limited to this arrangement. For example, two line sensors can simultaneously read two separate lines, and an output from one line sensor is delayed by a delay circuit or the like to be synchronized with an output from the other line sensor.

Figure 3:
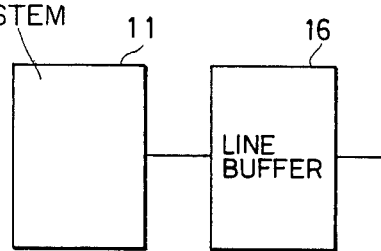
FIG. 3 is a block diagram of a processing circuit according to an embodiment of the present invention.

FIG. 3 shows the configuration of a processing circuit for processing an output shown in FIG. 2. The processing circuit includes a high-resolution image input system 11 including the high-resolution line sensor 201 shown in FIG. 2, a low-resolution image input system 12 including the low-resolution line sensor 202, a high pass filter 13 for performing edge detection of an output from the low-resolution image input system 12, and an image property discrimination processing apparatus or processor 14 for discriminating an edge block in accordance with an output from the high pass filter 13. A signal selection circuit 15 selects one of the signals from the high-resolution image input system 11 and the low-resolution image input system 12 and produces the selected signal as an output signal.

Line buffers 16 and 17 can store image signals of several lines, respectively. The line buffers 16 and 17 temporarily stores signals from the systems 11 and 12 and supply them to the signal selection circuit 15 after a predetermined delay time. The delay operation of the line buffers 16 and 17 is performed so as to supply the image signals to the signal selection circuit 15 in synchronism with the processing time of the high pass filter 13 and the image property discrimination processing apparatus 14.

An image signal J produced from the low-resolution image input system 12 is subjected to cutting of the low-frequency component by the high pass filter 13. The high pass filter 13 then produces an edge signal K corresponding to the edge in the image signal J. The edge signal K from the high pass filter 13 is subjected to edge block discrimination by the image property discrimination processing apparatus 14 which produces a block discrimination signal L of level "1" corresponding to an edge block. The apparatus 14 acts on a block consisting of n×m pixels, and calculates the number of pixels exceeding a threshold value within the block. If the number of pixels exceeding the threshold value in the block exceeds a predetermined value, the apparatus 14 produces a block discrimination signal L of level "1".

When the block discrimination signal L received from the apparatus 14 is at level "1", the signal selection circuit 15 selects an image signal I from the high-resolution image input system 11 and produces it as an output signal H. However, when the block discrimination signal L received from the apparatus 14 is at level "0", the signal selection circuit 15 selects an image signal J' from the low-resolution image input system 12 and produces it as an output signal H. The image signal selected by the signal selection circuit 15 is supplied to a next processing circuit stage such as a digitizing circuit, and is processed for dot printing, display, storage, transmission or the like.

Figure 4A:
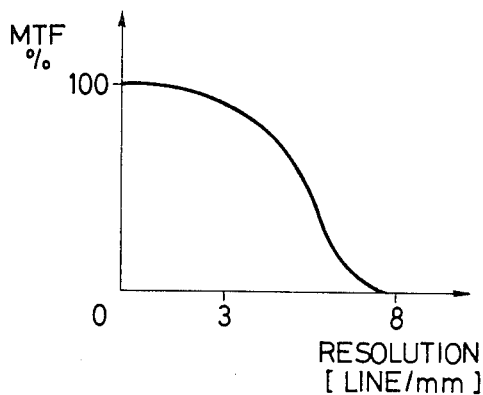
FIG. 4A is a graph showing the characteristics of an input resolution of a high-resolution image input system 11 shown in FIG. 3.
Figure 4B:
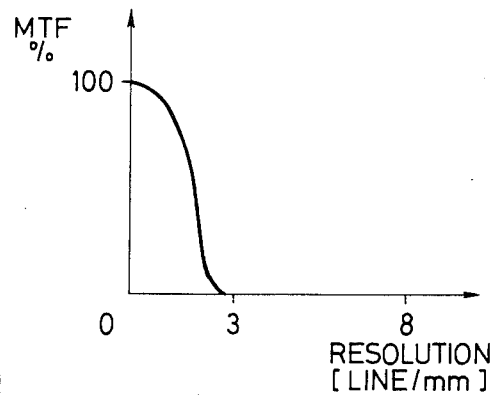
FIG. 4B is a graph showing the characteristics of an input resolution of a low-resolution image input system 12 shown in FIG. 3.

FIG. 4A is a graph showing an input resolution of the high-resolution image input system 11, and FIG. 4B shows the input resolution of the low-resolution image input system 12. It is assumed for the sake of simplicity herein that the sampling pitch of the systems 11 and 12 is the same.

Various methods have been proposed to determine the upper and lower limits of the resolution of an input system as shown in FIGS. 4A and 4B. For example, according to one method, the resolution above which an image of a size equal to or double the size of a dither matrix used for pseudo-halftone image reproduction cannot be resolved is used as the upper limit of the resolution of the low-resolution image input system 12. According to another method, the resolution above which an image equal in size to the basic dot of a halftone original cannot be resolved is used as the upper limit of the resolution of the low-resolution image input system 12.

Figures 5A, 5B:
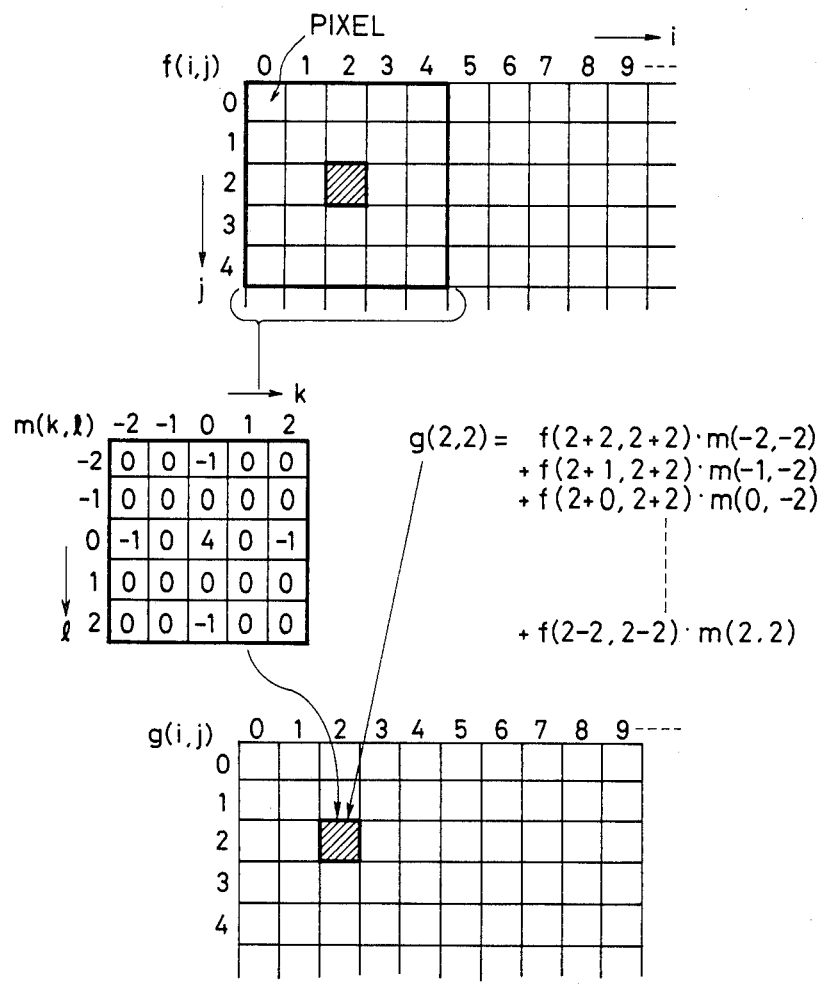
FIG. 5A shows an example of a coefficient matrix m (k, l) used in a high pass filter 13 shown in FIG. 3.
FIG. 5B is a diagram for explaining the mode of operation of the high pass filter 13.

FIG. 5A shows an example of a coefficient matrix used in the high pass filter 13. The high pass filter 13 comprises an arithmetic element for performing multiplication/addition operations of the coefficient matrix as shown in FIG. 5A with the input signal J from the low-resolution image input system 12. The input image signal J is a sequential digital signal. When a given coordinate position of an image point is the X-Y coordinate system is defined as (i, j), the image signal J can be given as f(i, j). When the input image signal J from the low-resolution image input system 12 is given as f(i, j) and the coefficient matrix as shown in FIG. 5A is given as m(k, l), an output signal K from the high pass filter 13 can be obtained as the absolute value of g(i, j) given by:

$$g(i,j) = \sum_{k=-a}^{a} \sum_{l=-a}^{a} f(i-k, j-l) \cdot m(k,l) \quad (1)$$

where the coefficient matrix m(k, l) has (0, 0) as the central coordinate position.

The high pass filter 13 does not perform multiplication/addition for an element of the coefficient matrix shown in FIG. 5A which is 0 and performs calculation of equation (1) only for elements which are not 0. FIG. 5B shows an example of this calculation processing.

Referring to FIG. 5B, high-pass filtering is performed for the image signal f(2, 2) using the coefficient matrix shown in FIG. 5A.

Figure 6A:
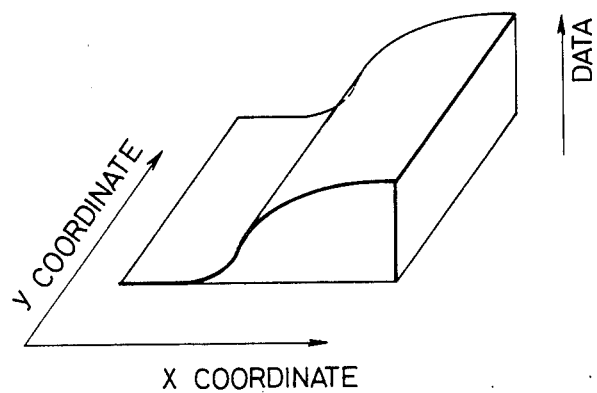
FIGS. 6A and 6B show waveforms of a faint input signal J shown in FIG. 3 corresponding to an edge of an image.
Figure 6B:
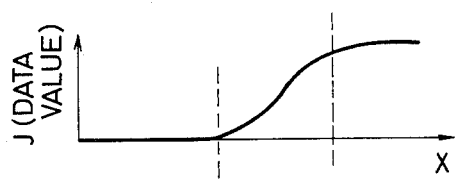
Figure 6C:
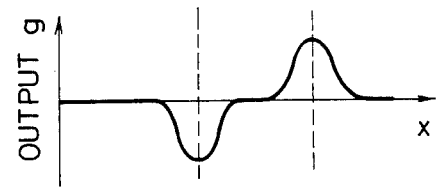
FIG. 6C shows a waveform of a signal g from the high pass filter shown in FIG. 3.
Figure 6D:
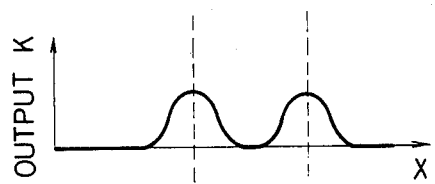
FIG. 6D shows a waveform of an edge signal from the high pass filter 13 shown in FIG. 3.

FIG. 6A two-dimensionally shows an example of the waveform of an input signal J corresponding to an edge portion of the image when the data value or magnitude is represented as height. FIG. 6B shows a section of the waveform shown in FIG. 6A along the X direction therein. FIG. 6C shows a waveform of g(i, j) obtained when the waveform shown in FIG. 6B is calculated in accordance with equation (1) above. FIG. 6D shows the absolute value of the waveform shown in FIG. 6C. In other words, FIG. 6D one-dimensionally shows an example of the waveform of the edge signal K obtained from the high pass filter 13 in correspondence with the edge position of the input signal J.

As can be seen from FIGS. 6A–6C, the high pass filter 13 produces an edge signal K as shown in FIG. 6D at a point at which the density of an image changes. The level of the edge signal K is higher as the change in density is greater.

Figure 7:
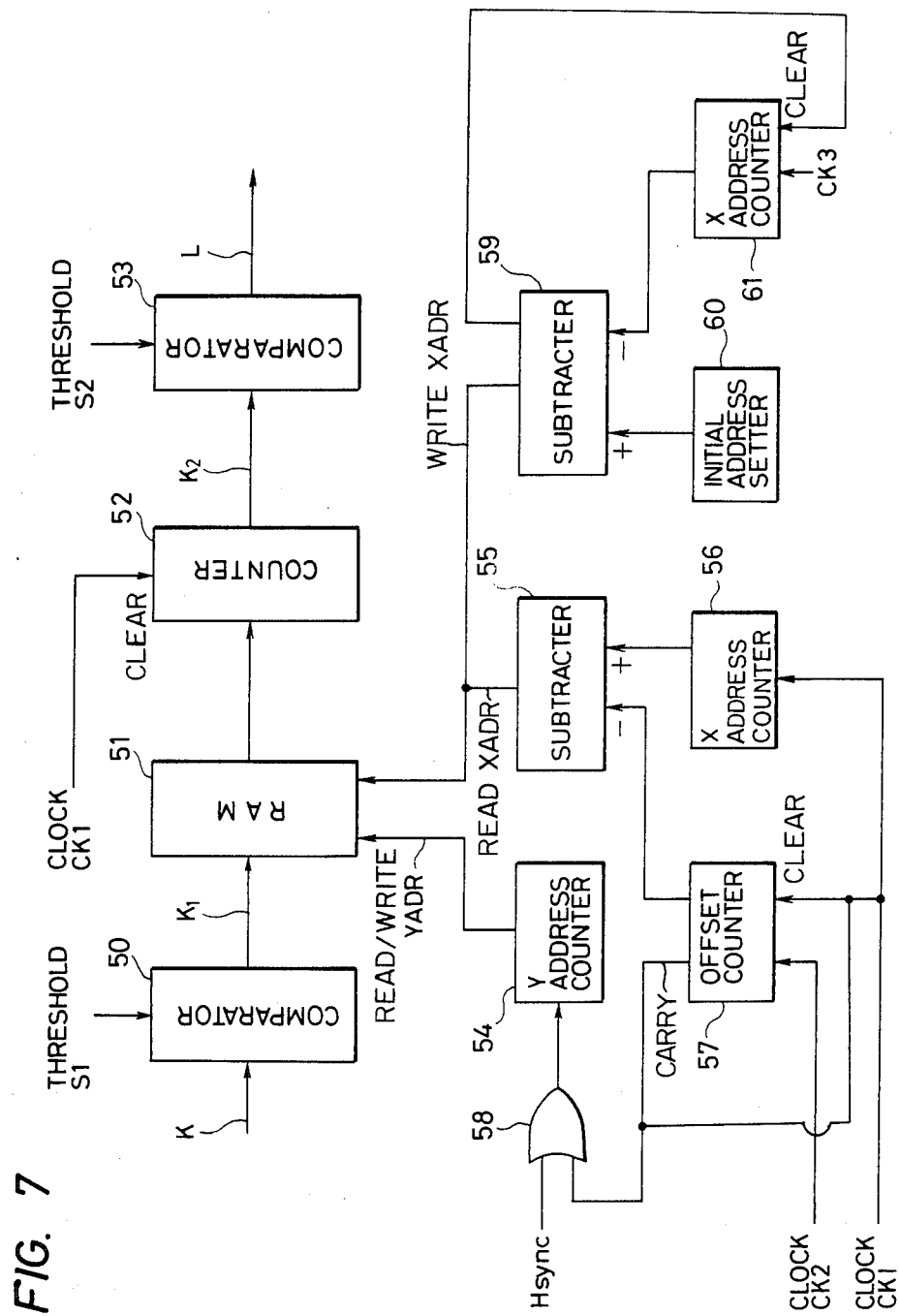
FIG. 7 is a block diagram showing an example of an arrangement of an image property discrimination processing apparatus 14 shown in FIG. 3.
Figure 8A:
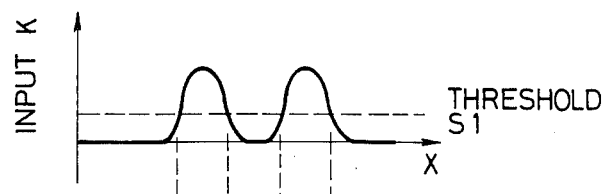
FIGS. 8A and 8B show waveforms for explaining the operation of a comparator 50 shown in FIG. 7.
Figure 8B:
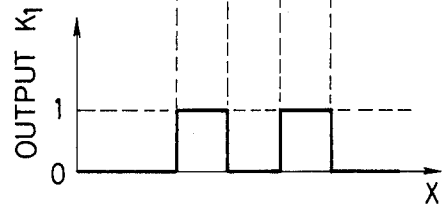
Figure 9A:
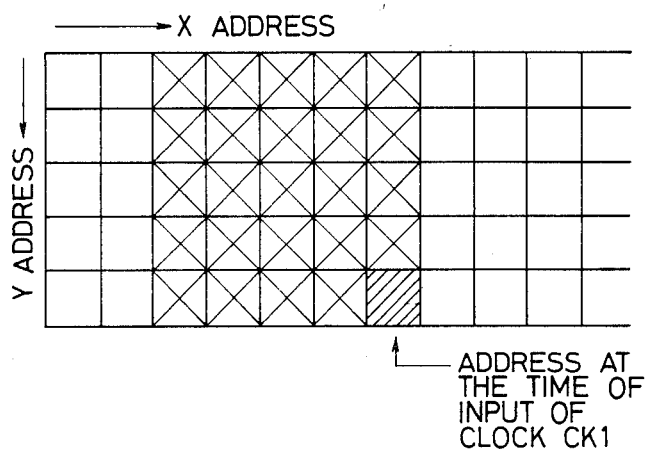
FIGS. 9A and 9B are diagrams for explaining data storage state of a RAM 51 shown in FIG. 7.
Figure 9B:
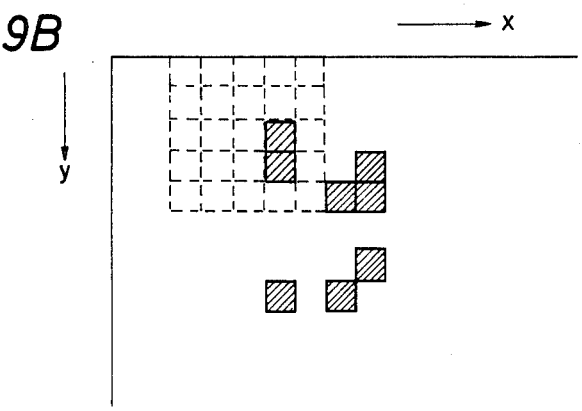

FIG. 7 is a block diagram showing an example of the configuration of the image property discrimination processing apparatus 14. A comparator 50 compares the edge signal K with a predetermined threshold value S1, and produces a 1-bit digital edge candidate point signal K1 in accordance with the comparison result. More specifically, when the signal K is larger than the threshold value S1, the comparator 50 produces a signal K1 of level "1". However, when the signal K is smaller than the threshold value S1, the comparator 50 produces a signal K1 of level "0" (see FIGS. 8A and 8B). A random access memory (RAM) 51 stores the edge candidate point signals K1 for a plurality of lines. FIG. 9A shows the address space of the RAM 51, and FIG. 9B shows the memory map of the edge candidate points K1 in the RAM 51. For the data in the RAM 51 shown in FIG. 9B, a rectangular or square block consisting of a n×m pixels (indicated by broken lines) is set in the read mode. The block is shifted by one pixel at a time by read address control.

Figure 10A:
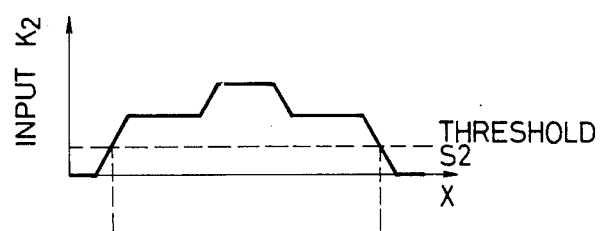
FIGS. 10A and 10B show waveforms for explaining the operation of a comparator 53 shown in FIG. 7.

A counter 52 counts the number of edge candidate points within the block (pixels for which the edge candidate point signals K1 are "1"). In other words, the counter 52 counts the number of pixels for which the edge signal K exceeds the predetermined threshold value S1 in the block indicated by the broken line in FIG. 9B. In this case, the count is 2. FIG. 10A shows the count result obtained along the X direction as the block is shifted.

A comparator 53 compares an edge number signal K2 form the counter 52 with a predetermined threshold value S2 and produces a digital block discrimination signal L in accordance with the comparison result.

A Y address counter 54 produces a Y address signal YADR designating a read/write Y address of the RAM 51. A subtracter 55 produces an X address signal XADR designating a read X address of the RAM 51. An X address counter 56 is counted up in increments of 5 counts upon each input of a first clock signal CK1 and supplies its count to the subtracter 55. An offset counter 57 is cleared in response to the first clock signal CK1. The offset counter 57 then counts second clock signals CK2 and supplies its count to the subtracter. 55. When the count reaches a predetermined offset value, the offset counter 57 supplies a carry signal to an OR gate 58 and is cleared by the carry signal.

A subtracter 59 produces an X address signal XADR designating a write X address. An initial address setter 60 sets an initial value of the write X address. The initial address setter 60 sets a maximum X address of the RAM 51. An X address counter 61 counts third clocks CK3 synchronized with an output from the comparator 50 for each pixel.

The subtracter 59 subtracts the count of the X address counter 61 from the initial address set in the initial address setter 60, and supplies the difference as the write X address signal for the RAM 51.

When the difference calculated by the subtracter 59 becomes 0, the X address counter 61 is cleared by a signal output by subtracter 59 for that purpose, and starts counting the clocks CK3.

The write operation of the edge candidate point signal K1 in the RAM 51 in the circuit of the configuration shown in FIG. 7 will be described. In the write mode, the operation of the X address counter 56, the offset counter 57 and the subtracter 55 in accordance with the clocks CK1 and CL2 is inhibited.

When a first horizontal sync signal Hsync synchronized with the on line read operation of the line sensors 201 and 202 is supplied, the count of the Y address counter 54 is set at 0. Then, the write Y address for the RAM 51 is set at 0. The subtracter 59 sequentially performs subtractions from the initial X address set by initial address setter 60 in synchronism with the output for each pixel from the comparator 50.

Thus, the edge candidate point signals K1 of one line serially output from the comparator 50 are sequentially stored in the location of Y address "0" of the RAM 51.

The Y address counter 54 is counted up in synchronism with the read operation of the next line by the line sensors 201 and 202, and the write Y address of the RAM 51 is set as 1. Then, the edge candidate point signals K1 serially output from the comparator 50 are sequentially stored at the location of the Y address "1" of the RAM 51.

The above storing operation is repeated by sequentially adding 1 to the Y address upon every line read operation so as to store in the RAM 51 the edge candidate point signals K1 of several lines (5 lines as shown in FIG. 9A in this embodiment) from the comparator 50.

The OR gate 58 calculates an OR product of the horizontal sync signal Hsync and the carry signal from the offset counter 57, and supplies a calculated result to the address counter 54.

The mode of operation of the image property discrimination processing apparatus 14 will be described in more detail with reference to a case wherein the block has 5×5 pixel size and the RAM 51 stores edge candidate point signals for 5 lines. The X address counter 56 is counted up in increments of 5 in response to a clock CK1 from a signal generator (not shown). The offset counter 57 and the counter 52 are cleared by clock CK1. The subtracter 55 subtracts the count of the offset counter 57 from the count of the X address counter 56, and generates an X address signal XADR. Since the content of the offset counter 57 is "0", the X address signal XADR becomes equal to the content of the X address counter 56. Meanwhile, the Y address counter 54 is incremented in unitary increments in accordance with an OR product of the horizontal sync signal Hsync and the carry signal from the offset counter 57. The Y address counter 57 produces the count as a Y address signal YADR.

The edge candidate point signal K1 is read out from the RAM 51 using the X address signal XADR and the Y address signal YADR as read addresses.

Thereafter, the above operation is repeated in synchronism with the second clock signals CK2. More specifically, the offset counter 57 is incremented in response to each clock signal CK2. Then, the X address signal XADR produced from the subtracter 55 is decremented by 1. The edge candidate point signal K1 is read out from the ram 51 using this X address signal XADR and the Y address signal YADR as the read addresses.

Since the block has the 5×5 pixel size, the offset counter 57 and the Y address counter 54 are quinary counters. Therefore, in response to the first clock signal CK2 generated upon repeating the above operation four times, the offset counter 57 generates a carry signal and is cleared to "0".

When the edge candidate point signal K1 read out from the RAM 51 in this manner is "1", the counter 52 is incremented by 1. When the signal K1 is "0", the counter 52 holds its previous count ("0" in this case).

The carry signal from the offset counter 57 is supplied to the Y address counter 54 to increment it by one. The edge candidate point signal K1 is read out from the RAM 51 using as the read addresses the Y address signal YADR which has been incremented by 1 and the X address signal XADR returned to the content of the X address counter 56. The counter 52 increments or holds its count in accordance with the value of the signal K1 in a manner as described above.

The Y address of the RAM 51 is for 5 lines, "0" to "4" as shown in FIG. 9A. Since the Y address counter 54 is a quinary counter, when it repeats the above operation five times, the edge candidate signal point signals K1 corresponding to all the pixels within the 5×5 block indicated by the broken line in FIG. 9B are read out from the RAM 51 and the number of such candidate points in the block is counted by the counter 52. The count of the counter 52 is supplied as the edge number signal K2 to the comparator 53 (FIG. 10A). The comparator 53 compares the edge number signal K2 with the predetermined threshold value S2, and produces a block discrimination signal L (Fit. 10B). Since the Y address counter 54 is a quinary counter, the counter 54 is incremented by 5 and returns to the initial value corresponding to the first clock CK1 upon completing the above operation five times.

The block discrimination signal L produced from the image property discrimination processing apparatus 14 is supplied to the signal selection circuit 15 shown in FIG. 3. When the block discrimination signal L is at level "1" indicating an edge block, the signal selection circuit 15 outputs the image signal I from the high-resolution image input system 11. However, when the block discrimination signal L is at level "0" indicating a non-edge block, the signal selection circuit 15 selects a low-resolution image input system image signal J from the low-resolution image input system 12. In this processing apparatus, the high-resolution image input system image signals I and the low-resolution image input system image signals J are stored for several lines by the line buffers 16 and 17, so as to adjust the time difference with the edge block signals L obtained upon filtering and block discrimination. After the adjustment, the signals I and J are supplied to the signal selection circuit 15. The scanning position of the line sensors 201 and 202 is also determined in consideration of the time difference.

According to another embodiment of the present invention, the low-resolution image input system 12 having the line sensor 202 is replaced with a low pass filter circuit which filters an output from the high-resolution image input system 11 and obtains a signal corresponding to the output signal from the low-resolution input system. With this arrangement, the same effect as that in the first embodiment can also be obtained.

In this manner, it is discriminated if an image of each block is an image consisting of characters or symbols or an image of photographs or dots in accordance with edge signals included in output signals from the low-resolution image input system.

When an image is discriminated to contain characters or symbols, the high-resolution image read output from the high-resolution image input system 11 is used as an image signal and is supplied to a next processing circuit stage. However, when an image is discriminated to contain photographs or dots, the low-resolution image read output from the low-resolution image input system 12 is selected as an image signal and is supplied to the next processing circuit stage.

In the apparatus of this embodiment, an image including characters or the like requiring a high resolution is read at high resolution and is reproduced clearly. On the other hand, a halftone image including photographs or dots, which may generate moiré if not processed properly, is read at a low resolution and will not cause image quality degradation such as moire upon being subjected to dither processing.

As described above, image signals are subjected to high pass filtering with a high pass filter for cutting the low frequency component from an output signal from an input system of low resolution. A block discrimination is performed in accordance with signals obtained by this high pass filtering. One of the output signals from the input systems having high and low resolutions, respectively, is selected and processed. For this reason, an image quality degradation such as moiré or a spot noise in a photograph image which is caused when a halftone image is read at a high resolution can be prevented, and at the same time, characters and edges can be reproduced clearly. Instead of selecting one of outputs from the high-resolution and low-resolution input image systems 11 and 12, one or both of these signals can be filtered and selected to obtain a still better image. Examples of such filtering include edge emphasis of the output signal from the high-resolution image input system 11; and processing by subtracting the data of the low-resolution image input system 12 from that of the high-resolution image input system 11, multiplying the difference, and adding the product to the data of the high-resolution image input system 12.

Although the present invention has been described with reference to the particular embodiments, the present invention is not limited thereto. Various other changes and modifications may be made within the spirit and scope of the present invention.

What is claimed is:

1. An image processing apparatus comprising:
   first input means for inputting image data of high resolution;
   second input means for inputting image data of low resolution;
   discriminating means for discriminating an image content of the image data inputted by said second input means; and
   selecting means for selecting the image data inputted by one of said first and second input means in accordance with a discrimination result of said discriminating means.

2. An apparatus according to claim 1, wherein said discriminating means discriminates the image content on the basis of an edge in the image data inputted by said second input means.

3. An apparatus according to claim 1, further comprising means for delaying the image data inputted by said first and second input means for a time period required for said discriminating means to perform a discrimination operation.

4. An apparatus according to claim 1, wherein said first and second input means comprise a line sensor for reading an image at a high resolution and a line sensor for reading an image at a low resolution, respectively.

5. An apparatus according to claim 1, wherein said discriminating means discriminates the image content by performing a discrimination operation on each of a plurality of blocks of image data of a predetermined size.

6. An apparatus according to claim 1, wherein said first and second input means simultaneously input said image data of high resolution and said image data of low resolution, respectively.

7. An apparatus according to claim 1, wherein said image data of high resolution and said image data of low resolution are representative of the same image.

8. An image processing apparatus comprising:
   first input means for inputting image data of low resolution;
   second input means for inputting image data of high resolution;
   means for detecting an edge candidate point in the image data of low resolution inputted by said first input means;
   means for discriminating an image content of the image data of low resolution in accordance with a detection result of said detecting means; and
   selecting means for selecting one of the image data of low resolution and the image data of high resolution in accordance with a discrimination result of said discriminating means.

9. An apparatus according to claim 7, wherein said discriminating means discriminates the image content by performing a discrimination operation on each of a plurality of blocks of image data of a predetermined size.

10. An apparatus according to claim 7, wherein said first and second input means comprise a line sensor for reading an image at a low resolution and a line sensor for reading an image at a high resolution, respectively.

11. An apparatus according to claim 8, wherein said image data of high resolution and said image data of low resolution are representative of the same image.

12. An apparatus according to claim 8, wherein said discriminating means comprises means for counting a number of edge candidate points, and discriminates the image content in accordance with the count of said counting means.

13. An image processing apparatus comprising:
   input means for inputting image data of low resolution;
   means for detecting an edge candidate point in the image data inputted by said input means;
   means for discriminating an image content of the image data in accordance with a detection result of said detecting means; and
   processing means for performing different processing in accordance with a discrimination result of said discriminating means;
   wherein said discriminating means comprises means for counting a number of edge candidate points, and discriminates the image content in accordance with the count of said counting means.

* * * * *

UNITED STATES PATENT AND TRADEMARK OFFICE
CERTIFICATE OF CORRECTION

PATENT NO. : 4,782,399
DATED : November 1, 1988
INVENTOR(S) : HIROAKI SATO

Page 1 of 2

It is certified that error appears in the above-identified patent and that said Letters Patent is hereby corrected as shown below:

COLUMN 2

Line 66, "corresponds" should read --correspond--.

COLUMN 3

Line 12, "registers 204 and 250" should read --registers 204 and 205--.

Line 50, "stores" should read --store--.

COLUMN 4

Line 44, "is" should read --in--.

COLUMN 5

Line 27, "8B). A" should read --8B). ¶ A--.
Line 33, "a" (second occurrence) should be deleted.

Line 47, "form" should read --from--.

COLUMN 6

Line 18, "on line" should read --one line--.

COLUMN 7

Figure 10B:
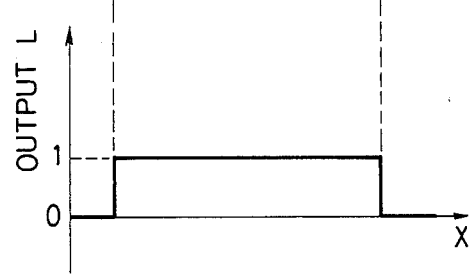

Line 4, "ram 51" should read --RAM 51--.
Line 37, "(Fit. 10B)." should read --(Fig. 10B).--.

UNITED STATES PATENT AND TRADEMARK OFFICE
CERTIFICATE OF CORRECTION

PATENT NO. : 4,782,399
DATED : November 1, 1988
INVENTOR(S) : HIROAKI SATO

It is certified that error appears in the above-identified patent and that said Letters Patent is hereby corrected as shown below:

COLUMN 8

Line 47, "system 12." should read --system 11.--.

COLUMN 10

Line 3, "claim 7," should read --claim 8,--.
    Line 8, "claim 7," should read --claim 8,--.
    Line 28, "processing" (second occurrence) should read --processings--.

Signed and Sealed this

Twenty-seventh Day of June, 1989

Attest:

DONALD J. QUIGG

Attesting Officer      Commissioner of Patents and Trademarks